(12) United States Patent
Banerjee et al.

(10) Patent No.: US 9,890,052 B2
(45) Date of Patent: Feb. 13, 2018

(54) METHOD FOR RECOVERING CYANIDE FROM A BARREN SOLUTION

(71) Applicant: Veolia Water Solutions & Technologies Support, Saint-Maurice (FR)

(72) Inventors: Kashi Banerjee, Moon Township, IL (US); Herve Buisson, Apex, NC (US)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 0 days.

(21) Appl. No.: 15/268,731

(22) Filed: Sep. 19, 2016

(65) Prior Publication Data

US 2017/0081202 A1 Mar. 23, 2017

Related U.S. Application Data

(60) Provisional application No. 62/221,143, filed on Sep. 21, 2015.

(51) Int. Cl.

| | | |
|---|---|---|
| *C01C 3/00* | (2006.01) | |
| *C01C 3/10* | (2006.01) | |
| *C22B 11/08* | (2006.01) | |
| *C22B 3/04* | (2006.01) | |
| *C22B 3/22* | (2006.01) | |
| *C22B 3/44* | (2006.01) | |
| *B01J 19/12* | (2006.01) | |

(52) U.S. Cl.
CPC ............... *C01C 3/10* (2013.01); *B01J 19/123* (2013.01); *C22B 3/04* (2013.01); *C22B 3/22* (2013.01); *C22B 3/44* (2013.01); *C22B 11/08* (2013.01); *B01J 2219/0877* (2013.01); *B01J 2219/1203* (2013.01); *Y02P 10/234* (2015.11)

(58) Field of Classification Search
CPC .. C01C 3/10; C22B 11/08; C22B 3/22; C22B 3/24; C22B 3/44; C22B 3/04; B01J 19/123
USPC ........... 423/29–31, 384; 204/157.46, 157.64, 204/157.81, 157.85
See application file for complete search history.

(56) References Cited

FOREIGN PATENT DOCUMENTS

| | | | |
|---|---|---|---|
| CN | 104193058 A | * | 12/2014 |
| CN | 204569628 U | * | 8/2015 |

OTHER PUBLICATIONS

Fui, L., "Removal of Cyanide Using Photocatalysis-Membrane Hybrid System", Faculty of Engineering and Science, Universiti Tunku Abdul Rahman, Apr. 15, 2011, pp. 1-75.
Estay, H., et al., "A novel process based on gas filled membrane absorption to recover cyanide in gold mining", Hydrometallurgy, Elsevier, Mar. 4, 2013, pp. 166-176, vol. 134-135.
Logsdon, M., et al., "The Management of Cyanide in Gold Extraction", International Council on Metals and the Environment, ICME, Apr. 1, 1999, pp. 1-40.

* cited by examiner

*Primary Examiner* — Steven J Bos
(74) *Attorney, Agent, or Firm* — Coats & Bennett, PLLC

(57) ABSTRACT

A process is disclosed for recovering cyanide used to leach gold or silver from ore. In the course of leaching gold or silver from ore, a barren solution is generated. A portion of the barren solution containing sodium cyanide is recycled to the cyanidation process while blowdown from the barren solution is subjected to pre-treatment, UV photodissociation and pH adjustment. Ultimately, a volatile hydrocyanic acid is formed and is absorbed into a sodium hydroxide solution through the employment of a gas-filled membrane. This forms sodium cyanide that can be recycled and used in the cyanidation process to leach gold or silver from ore.

20 Claims, 2 Drawing Sheets

METHOD FOR RECOVERING CYANIDE FROM A BARREN SOLUTION

CROSS-REFERENCE TO RELATED APPLICATION

This application claims priority under 35 U.S.C. § 119(e) from the following U.S. provisional application: Application Ser. No. 62/221,143 filed on Sep. 21, 2015. That application is incorporated in its entirety by reference herein.

FIELD OF THE INVENTION

The present invention relates to cyanide recovery processes and more particularly to recovering cyanide from a barren solution.

BACKGROUND OF THE INVENTION

Cyanidation is a process used in the mining industry where metals are leached from ores into a weak solution of sodium cyanide. Once the metals are leached from the ores, the metals such as gold and silver are precipitated and separated from the sodium cyanide solution. A relatively large portion of the sodium cyanide solution is recirculated back to the cyanidation process to take advantage of the leaching potential for the metals. It is, however, necessary to blow down a portion of this barren solution to avoid the buildup of unwanted metals and anions. Eventually the blowdown is sent to a tailings pond or other holding area for removal of metals and cyanide prior to discharge. The increasing cost of cyanide, strict environmental regulations, and a need to insure sustainable operations have led to increased interest in cyanide recovery.

A number of processes for recovering cyanide from barren solutions have been developed. Most of the processes require that the recoverable cyanide is first converted to the highly toxic hydrocyanic acid (HCN). Handling of this compound presents concerns from a health and safety perspective. An acidification, volatilization, and re-neutralization (AVR) process has been used in the past for cyanide recovery. However, this process has several drawbacks: 1) it recovers only free cyanide, 2) it cannot recover cyanide from its complex forms, and 3) because of the high cyanide to air ratio, the CAPEX and OPEX of the process are high. Furthermore, since the presence of HCN in the stripping column is potentially hazardous, the columns must be leak proof.

Besides the AVR process, several other processes have been investigated to recover cyanide from weak acid dissociable (WAD) metal complexes (copper, zinc, and nickel cyanide). For example, the Sulphidization, Acidification, Recycling and Thickening (SART) process was developed, but has not been operated yet in a full-scale plant so its reliability is unknown. Laboratory and pilot-scale systems have been used to evaluate the applicability of ion exchange (IX), adsorption onto granular activated carbon, and adsorption onto activated alumina. However, information pertaining to the full-scale installation of these processes is not available yet. Therefore, an efficient cyanide recovery technology that can minimize the volatilization of HCN into the environment is needed.

SUMMARY OF THE INVENTION

The present invention entails a process for recovering cyanide from a barren solution or other aqueous solution that contains cyanide. First, in the case of a barren solution, for example, the barren solution is subjected to pre-treatment to remove various metals and oxyanions. Thereafter, the barren solution is subjected to a photodissociation process that causes metal-cyanide complexes in the barren solution to form free cyanide. This typically occurs at a relatively high pH. Thereafter, the pH is lowered causing the free cyanide to form volatile hydrocyanic acid. The barren solution with the volatile hydrocyanic acid is directed to a gas-filled membrane where the hydrocyanic acid is absorbed by a stripping solution, sodium hydroxide. The absorption of the hydrocyanic acid by the sodium hydroxide results in the formation of sodium cyanide which can be used in a wide variety of industrial processes, particularly in the mining industry.

Other objects and advantages of the present invention will become apparent and obvious from a study of the following description and the accompanying drawings which are merely illustrative of such invention.

DESCRIPTION OF EXEMPLARY EMBODIMENTS

Figure 1:
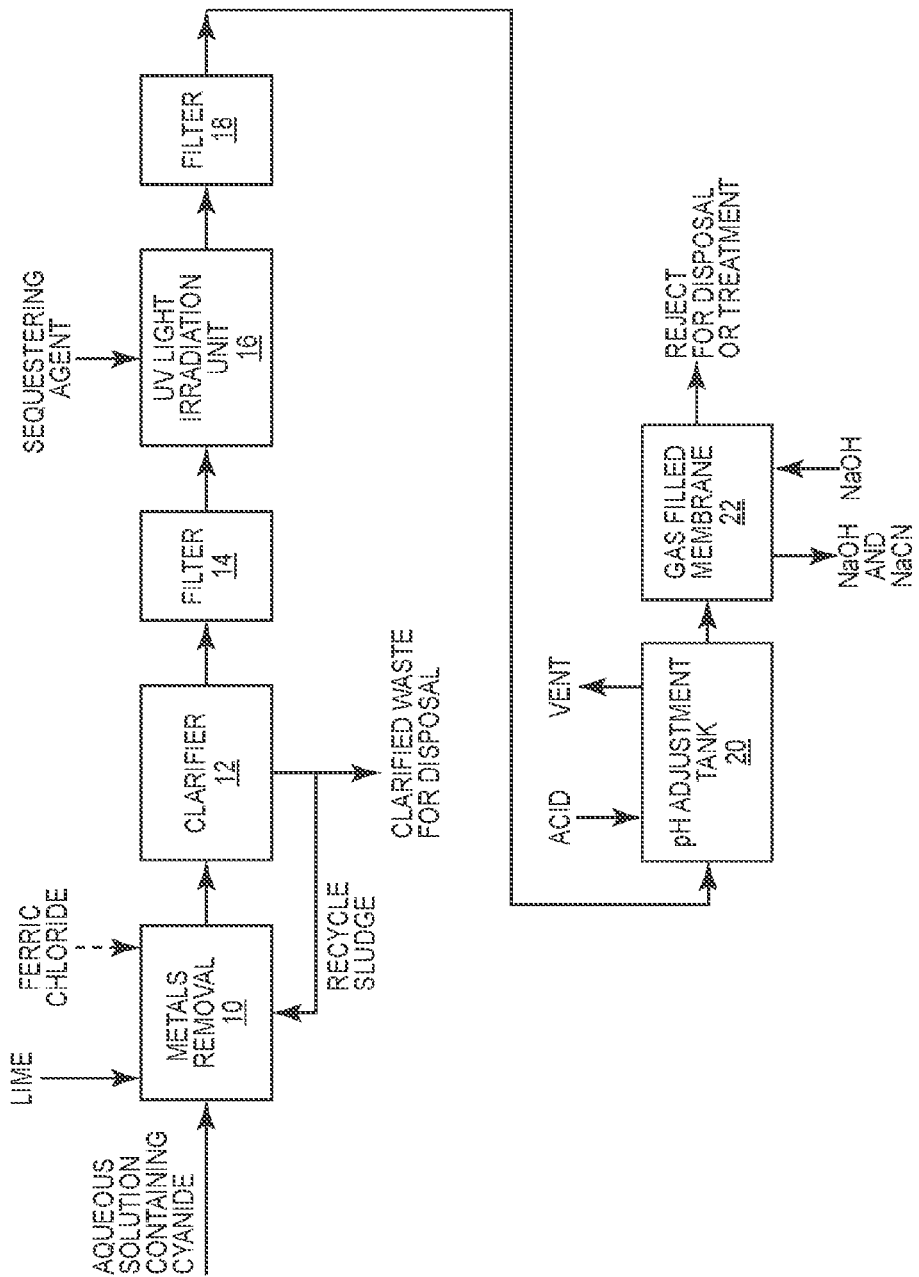
FIG. 1 is a schematic illustration of one embodiment of the cyanide recovery process of the present invention.

The present invention relates to a method of recovering cyanide from an aqueous solution. Generally, the processes disclosed herein entail a pre-treatment process for removing metals and oxyanions. This is followed by treating the aqueous solution with ultraviolet light which results in the photodissociation of various metal-cyanide complexes and forming free cyanide. The free cyanide is converted to volatile hydrocyanic acid by adjusting the pH of the aqueous solution down to about 6.0-6.5. After pH adjustment, the aqueous solution including the hydrocyanic acid is directed to a gas-filled membrane. The hydrocyanic acid in the aqueous solution diffuses through the pores of the membrane and is absorbed in a sodium hydroxide solution in the stripping side of the gas-filled membrane. This produces sodium cyanide and effectively provides a means of recovering the cyanide from the aqueous solution. The following description explains these individual processes and the total process in more detail.

In many cases, the cyanide-containing aqueous solution will have a relatively high pH. This is true for a cyanidation process where the optimum pH is about 10.0 to about 10.5. Thus, in these cases, one anticipates that most of the metals will already be precipitated in the aqueous solution. To assure removal of remaining dissolved metals, the aqueous solution is treated such that the metals are removed through precipitation and/or a co-precipitation/adsorption process. This is achieved, in one embodiment, by pumping the aqueous solution into a mixing reactor such as the TURBOMIX® reactor that is marketed by Veolia Water Technologies, Inc. See FIG. 1 and block 10. To precipitate metal ions, various alkali sources such as a caustic (NaOH), hydrated lime ($Ca(OH)_2$), quick lime (CaO) or magnesium hydroxide ($Mg(OH)_2$) can be used. Under these conditions, free cyanide ions will exist as highly soluble cyanide ions. This means that the risk of volatilization of hydrocyanic acid gas (HCN) from the mixing reactor is minimized. However, in a preferred design, the mixing reactor is covered but provided with a vent. In some cases, the aqueous solution may include significant hardness in the form of calcium and magnesium, for example. In these cases, the hardness should be removed in order to prevent carbonate and sulfate scaling of downstream equipment, particularly downstream membranes.

In one embodiment in this pre-treatment process, lime is added and mixed with the aqueous solution. See FIG. 1. This results in the precipitation of remaining metals and in the precipitation of hardness compounds. Some cases will not require the addition of a ferric ion because the aqueous solution (such as a spent barren solution resulting from a cyanidation process) contains adequate ferric ions in the form of ferric hydroxide. In any event, ferric ions function as a coagulant to destabilize solids and, therefore, facilitates their removal through precipitation. If required, ferric chloride can be added to co-precipitate and adsorb the low concentration of oxyanions in the aqueous solution.

As a part of pre-treatment, the precipitants and suspended solids are removed from the aqueous solution. This can be achieved through clarification. A clarifier 12 can form an integral part of the TURBOMIX® mixing reactor or the clarifier can be disposed downstream from the mixing reactor 10 as shown in FIG. 1. In any event, the precipitants and suspended solids are settled to form sludge or a concentrated waste stream. In one embodiment, a portion of the sludge is recycled back to the mixing reactor 10 while a portion of the sludge is disposed of through conventional means or subjected to further treatment.

After clarification, the aqueous solution can be filtered to remove residual precipitants and suspended solids. In the embodiment illustrated herein, a multimedia filter 14 is employed. At this point in the process, substantial precipitants and suspended solids have been removed from the aqueous solution. But there remains some free cyanide as well as metal-cyanide complexes such as copper, zinc and nickel cyanide in the aqueous solution.

To address the metal-cyanide complexes, the present process envisions subjecting the aqueous solution to ultraviolet (UV) light in a UV irradiation unit 16. The pH of the aqueous solution is at a relatively high pH, greater than 8.0 and typically in the range of 10.0-10.5. UV lights are provided with shrouds or sleeves and submerged in the aqueous solution. The shrouds or sleeves surround the UV lights and may have a tendency to foul due to the relatively high pH (pH of 10.0-10.5) of the aqueous solution. In order to protect against fouling of the shrouds or sleeves, a sequestering agent or anti-scalant can be added to the aqueous solution to maintain metal hydroxides in solution.

UV light, having a wave length in the region from 200 to 350 nm, causes the metal-cyanide complexes in the aqueous solution to undergo photodissociation. The free cyanide ions in the aqueous solution do not respond to ultraviolet light. However, some of the weak acid dissociables (WAD) cyanides and strong acid cyanide complexes, particularly the ferric and ferrous hexacyanide complexes, respond well during the photolysis reaction that takes place according to the following mechanism:

$$Fe(CN)_6^{3-}+3H_2O+h\Omega=6CN^-+Fe(OH)_3+3H^+$$

Optimum pH for photodissociation of metal-cyanide complexes is 10.0-10.5. In the presence of UV light, the metal-cyanide complexes generate free cyanide and metal hydroxides. In some cases, it may be desirable to filter the aqueous solution after it has been subjected to UV light irradiation. Thus, as an option, a filter 18, such as a cartridge filter, can be employed to further filter the aqueous solution downstream of UV light treatment. The cartridge filter will remove fine particles of metal hydroxide.

Now the process turns to removing the free cyanide from the aqueous solution. To achieve this, the process aims to convert the free cyanide to hydrocyanic acid gas. In order to do this, the pH of the aqueous solution must be adjusted downwardly by the addition of an acid. To make the conversion, the aqueous solution primarily containing the free cyanide is directed to a leak proof covered tank 20 where the pH is adjusted downwardly. In one embodiment, the pH is adjusted downwardly to approximately 6.0 to 6.5. This causes the free cyanide in the aqueous solution to form the hydrocyanic acid gas.

Now the process turns to recovering cyanide from the hydrocyanic acid gas. This is achieved by employing a gas-filled membrane 22 and a stripping solution that in one embodiment is sodium hydroxide. It should be noted that for health and safety concerns the aqueous solution containing the hydrocyanic acid gas should be stored or held relatively close to the gas-filled membrane 22. A gas-filled membrane is a hydrophobic microporous membrane in which the pores are filled with a gas such as air. The gas-filled membrane is especially suited to separating and recovering volatile substances, including hydrocyanic acid gas. When the gas-filled membrane 22 is disposed between the aqueous solution containing hydrocyanic acid vapor and the chemical stripping solution (sodium hydroxide), water is repulsed and gas (air) remains in the membrane pores. In the case of hydrocyanic acid gas, it diffuses through the boundary layer from the bulk of the feed to the feed-membrane interface. The hydrocyanic acid evaporates at the feed-membrane interface and diffuses through the air in the membrane pores and moves from the feed side of the membrane to the stripping side. In the example discussed herein, the stripping solution is sodium hydroxide. The hydrocyanic acid gas is absorbed by the sodium hydroxide and instantaneously reacts with the sodium hydroxide at the membrane-stripping interface forming sodium cyanide. Thus, cyanide is recovered from the aqueous solution and the recovery is in the form of sodium cyanide which can be used, as discussed below, in a number of industrial processes, including the extraction of gold or silver, as well as other metals.

The process just described is shown schematically in FIG. 1. The process described therein is suitable for a variety of cyanide containing aqueous solutions where it is desirable to recover cyanide. There are many applications for the general process shown in FIG. 1.

Figure 2:
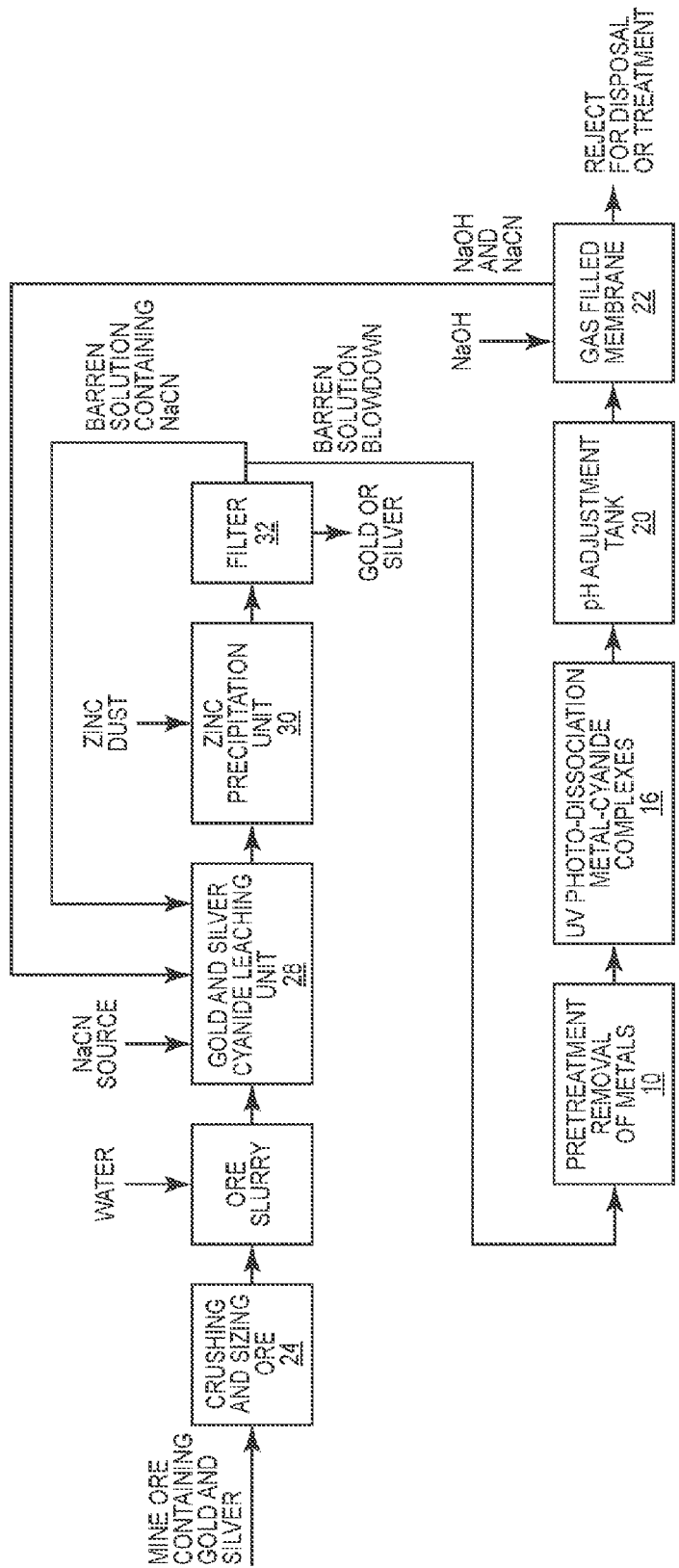
FIG. 2 is a schematic illustration showing an application of the cyanide recovery process of the present invention where the cyanide recovery process is employed in the mining industry.

FIG. 2 shows a particular application of the process shown in FIG. 1. The FIG. 2 process depicts a system and process for leaching gold and silver from ore through a cyanidation process and thereafter recovering cyanide from a spent barren cyanidation solution. As used herein, the term "barren solution" means any aqueous solution. As shown schematically in FIG. 2, ore containing gold and/or silver is crushed and sized in a crushing and sizing unit 24. Thereafter, a slurry is formed by adding water to the crushed ore. The slurry containing the crushed ore containing gold and/or silver is directed to a leaching tank 28. Tank 28 includes a cyanidation solution that is typically sodium cyanide. The sodium cyanide solution causes the gold and silver to leach out of the ore into the sodium cyanide solution. The slurry from the leaching tank 28 is directed to a zinc precipitation unit 30. In the example illustrated herein, zinc dust is mixed with the slurry, causing gold and silver to precipitate in the zinc precipitation tank 30. From the zinc precipitation tank 30, the slurry including the precipitated gold and silver is directed to a filter 32 where the gold and silver are separated from the slurry. The effluent from the filter 32 is the barren solution or a spent barren solution and contains sodium cyanide. This barren solution containing sodium cyanide is recycled to the leaching tank 28 for further use in leaching gold and silver from the ore slurry. However, a portion of the spent barren solution must be wasted or, in the case of the present invention, subjected to the recovery of cyanide. This is because the barren solution becomes contaminated with metals and oxyanions and other contaminants that cause the sodium cyanide solution to be ineffective for leaching purposes. Therefore, the present invention purges a portion of the barren solution being recycled to the leaching tank 28 and directs that barren solution through the process shown in FIG. 1 and described above. The process described in FIG. 1 need not be repeated in detail. Suffice it to say that the barren solution blowdown shown in FIG. 2 is subjected to a pre-treatment process for removing metals and thereafter the barren solution is subjected to the UV photodissociation process that produces free cyanide. By adjusting the pH of the barren solution after the UV light irradiation treatment, free cyanide is converted to volatile hydrocyanic acid in the pH adjustment tank 20 and thereafter the hydrocyanic acid is absorbed by a sodium hydroxide stripping solution in the gas-filled membrane 22. The absorption of the hydrocyanic acid into the sodium hydroxide solution forms sodium cyanide that can be recycled back to the leaching tank 28.

Thus, the present process is an efficient method of recovering cyanide and is particularly useful in the mining industry where cyanide is used for leaching gold and silver, and other metals from ores. The combination of pre-treatment, ultraviolet light photodissociation and cyanide recovery in a gas-filled membrane makes the overall process safe, compact and cost effective.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of recovering cyanide from a barren solution containing sodium cyanide, metals and metal-cyanide complexes, comprising:
   pre-treating the barren solution and removing metals therefrom by precipitation and/or co-precipitation and adsorption;
   after pre-treatment, directing the barren solution to an ultraviolet irradiation unit;
   irradiating the pre-treated barren solution at a pH greater than 8.0 with ultraviolet light which causes the metal-cyanide complexes to undergo photodissociation and form free cyanide;
   after irradiating the pre-treated barren solution, adding an acid to the barren solution and adjusting the pH of the barren solution to approximately 6.0-6.5 to form hydrocyanic acid gas in the barren solution;
   after forming the hydrocyanic acid gas in the barren solution, directing the barren solution to a gas-filled membrane; and
   directing a sodium hydroxide solution through a stripping side of the gas-filled membrane and diffusing the hydrocyanic acid gas through pores in the gas-filled membrane where the hydrocyanic acid gas is absorbed by the sodium hydroxide on the stripping side of the gas-filled membrane to form a sodium cyanide solution.

2. The method of claim 1 wherein pre-treating the barren solution includes mixing sodium hydroxide, hydrated lime, quick lime, or magnesium hydroxide with the barren solution.

3. The method of claim 2 wherein pre-treating the barren solution further includes mixing a coagulant with the barren solution.

4. The method of claim 1 wherein removing metals from the barren solution includes clarifying the barren solution prior to directing the barren solution to the ultraviolet irradiation unit.

5. The method of claim 4 wherein prior to directing the barren solution to the irradiation unit but after the barren solution has been clarified, the method includes filtering the barren solution.

6. The method of claim 1 including mixing an anti-scalant with the barren solution in the irradiation unit or at a point upstream of the irradiation unit.

7. The method of claim 1 including irradiating the barren solution with ultraviolet light having a wave length in the region from 200 to 300 nm which causes the metal-cyanide complexes in the barren solution to undergo photo disassociation.

8. The method of claim 1 including irradiating the barren solution with ultraviolet light at a pH of 10.0 to 10.5.

9. The method of claim 1 wherein after irradiating the barren solution with ultraviolet light, filtering the barren solution and removing fine particles of metal hydroxide.

10. The method of claim 1 including mixing the sodium cyanide solution with ore containing gold or silver and leaching the gold or silver from the ore into the sodium cyanide solution.

11. The method of claim 10 including precipitating gold or silver from the sodium cyanide solution and filtering the gold or silver from the sodium cyanide solution.

12. A method of recovering gold or silver from ore contained in an ore slurry and recovering sodium cyanide used to leach gold or silver from the ore, the method comprising:
   directing the ore slurry containing gold or silver to a leaching tank;
   mixing sodium cyanide with the ore to form a sodium cyanide solution;
   leaching gold or silver from the ore into the sodium cyanide solution;
   adding a reagent to the sodium cyanide solution and precipitating gold or silver from the sodium cyanide solution;
   filtering the gold or silver from the sodium cyanide solution which yields a barren solution containing sodium cyanide;
   pre-treating the barren solution and removing metals therefrom by precipitation, and/or co-precipitation and adsorption;
   after pre-treatment, directing the barren solution to an ultraviolet irradiation unit;
   irradiating the pre-treated barren solution at a pH greater than 8.0 with ultraviolet light which causes the metal-cyanide complexes to undergo photodissociation and form free cyanide;
   after irradiating the pre-treated barren solution, adding an acid to the barren solution and adjusting the pH of the barren solution to approximately 6.0-6.5 to form hydrocyanic acid gas in the barren solution;

after forming the hydrocyanic acid gas in the barren solution, directing the barren solution to a gas-filled membrane;

directing a sodium hydroxide solution through a stripping side of the gas-filled membrane and diffusing the hydrocyanic acid gas through pores in the gas-filled membrane where the hydrocyanic acid gas is absorbed by the sodium hydroxide on the stripping side of the gas-filled membrane to yield sodium cyanide; and recycling at least a portion of the sodium cyanide produced by the gas-filled membrane to the leaching tank such that the sodium cyanide can be reused to leach gold or silver from the ore.

13. The method of claim 12 wherein pre-treating the barren solution includes mixing sodium hydroxide, hydrated lime, quick lime, or magnesium hydroxide with the barren solution.

14. The method of claim 13 wherein pre-treating the barren solution further includes mixing a coagulant with the barren solution.

15. The method of claim 12 wherein removing metals from the barren solution includes clarifying the barren solution prior to directing the barren solution to the ultraviolet irradiation unit.

16. The method of claim 15 wherein prior to directing the barren solution to the irradiation unit but after the barren solution has been clarified, the method includes filtering the barren solution.

17. The method of claim 12 including mixing an antiscalant with the barren solution in the irradiation unit or at a point upstream of the irradiation unit.

18. The method of claim 12 including irradiating the barren solution with ultraviolet light having a wave length in the region from 200 to 300 nm which causes the metal-cyanide complexes in the barren solution to undergo photo disassociation.

19. The method of claim 12 including irradiating the barren solution with ultraviolet light at a pH of 10.0 to 10.5.

20. The method of claim 12 wherein after irradiating the barren solution with ultraviolet light, filtering the barren solution and removing fine particles of metal hydroxide.

* * * * *